United States Patent [19]

Hosaka et al.

[11] 4,437,342

[45] Mar. 20, 1984

[54] DIAGNOSTIC SYSTEM FOR DETECTING FAULT IN FUEL SYSTEM OF ENGINE HAVING ELECTRONIC FUEL INJECTION SYSTEM

[75] Inventors: Akio Hosaka; Akito Yamamoto; Katsunori Oshiage, all of Yokosuka, Japan

[73] Assignee: Nissan Motor Co., Ltd., Yokohama, Japan

[21] Appl. No.: 388,606

[22] Filed: Jun. 15, 1982

[30] Foreign Application Priority Data

Jul. 8, 1981 [JP] Japan ............................... 56-105677

[51] Int. Cl.³ ........................................... G01M 15/00
[52] U.S. Cl. ................................................. 73/119 A
[58] Field of Search ............. 73/119 A, 114; 364/442

[56] References Cited

U.S. PATENT DOCUMENTS 4,002,062  1/1977  Kuno et al. ........................... 73/114
4,253,330  3/1981  Kato ............................. 73/119 A X Primary Examiner—Jerry W. Myracle
Attorney, Agent, or Firm—Schwartz, Jeffery, Schwaab, Mack, Blumenthal & Koch

[57] ABSTRACT

A fault diagnostic system is arranged to detect faults in a fuel system of an engine with an electronic fuel injection system by monitoring the quantities of fuel consumed during a time interval. To do this, the consumption quantity of fuel is determined from a decrease of the residual quantity of fuel remaining in a fuel tank which is detected by a fuel gauge. On the other hand, the fuel injection quantity is determined independently by summing the length of the injector open time of each injection. Then, the fuel consumption quantity and the fuel injection quantity during the same time interval are compared. If the difference therebetween is larger than a predetermined permissible range, it is decided that there is some fault somewhere in the fuel system, and an indication signals is produced.

6 Claims, 6 Drawing Figures

DIAGNOSTIC SYSTEM FOR DETECTING FAULT IN FUEL SYSTEM OF ENGINE HAVING ELECTRONIC FUEL INJECTION SYSTEM

BACKGROUND OF THE INVENTION

The present invention relates to a fault diagnostic system for detecting faults or malfunctions in a fuel system of an engine equipped with an electronic fuel injection system.

Recently, electronic concentrated engine control systems are widely used in automobiles. In such a centralized control system, an electronic control unit composed of a microcomputer receives various input signals from sensors provided at various portions of an automobile, processes the signals and outputs command signals to manipulate various actuators to control the engine. Thus, controls of a fuel system, an ignition system, and an idling control system are organically related with each other, and the input signals from the sensors and information on controlled conditions are further utilized for fault diagnosis and self correction.

In one example of fault diagnostic systems used in such a control system, faults in an ignition system are detected by delivering an ignition command signal to an ignition coil and detecting the terminal voltage of the primary side of the ignition coil. However, such a diagnostic system is not suitable for a diagnosis of a fuel injection system. First, many input/output circuits must be provided to handle feedback signals from respective injectors in order to check each injector. Secondly, such a diagnostic system can not detect mechanical troubles free from electrical abnormality, such as lack of fuel due to clogging of an injector or deviation of fuel injection quantity due to deviation of fuel pressure.

SUMMARY OF THE INVENTION

It is an object of the present invention to provide a reliable fault diagnostic system which can detect, with a simple construction, a variety of electrical and mechanical troubles in a fuel system of an engine equipped with an electronic fuel injection system.

According to the present invention, the fault diagnostic system for detecting faults in a fuel system of an engine with an electronic fuel injection system is provided with means for determining the injection quantity of fuel injected by injector means by summing the length of the injector opening time of each injection, means for measuring the residual quantity of fuel remaining in a fuel tank for the engine, and means for calculating the consumption quantity of fuel removed from the fuel tank by calculating the amount of a decrease of the residual fuel quantity measured by the residual fuel quantity measuring means. Thus, the fuel injection quantity and the fuel consumption quantity are determined independently. There is further provided checking means which receives information on the fuel injection quantity from the fuel injection quantity determining means and information on the fuel consumption quantity from the fuel consumption quantity calculating means, then calculates the difference between the fuel injection quantity during a predetermined time interval and the fuel consumption quantity during the same time interval, checks if the difference is within a predetermined permissible range, and produces an abnormal signal when the difference is outside the range. There is further provided indicating means which produces a fault signal indicative of occurrence of a fault in response to the abnormal signal of the checking means.

DETAILED DESCRIPTION OF THE INVENTION

Figure 1:
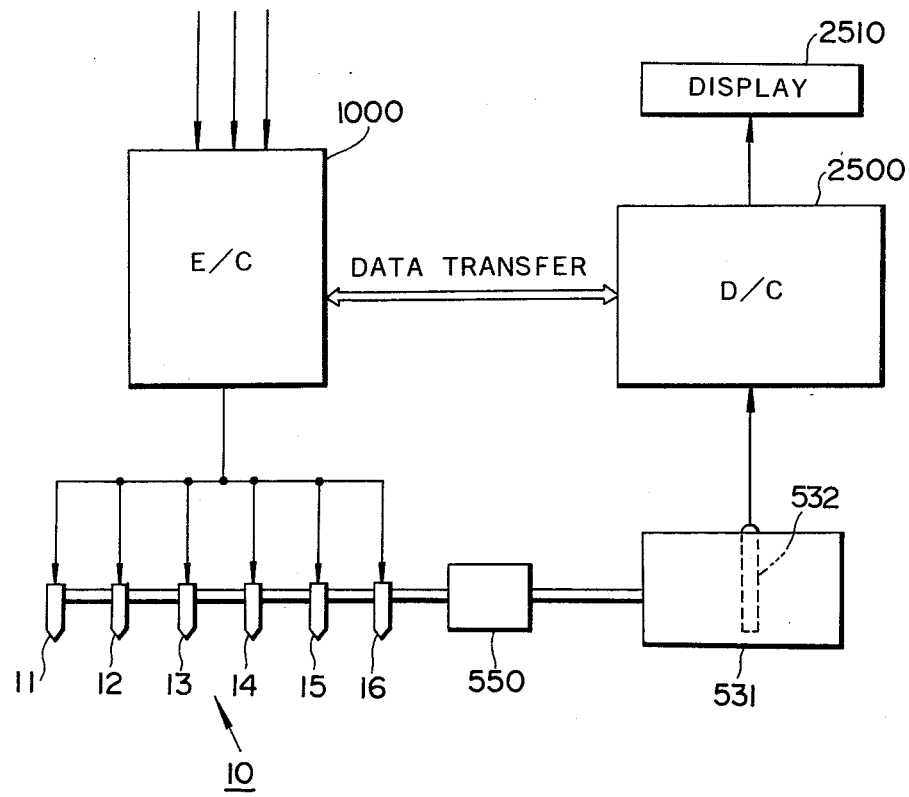
FIG. 1 is a schematic diagram of a diagnostic system of the present invention.

One embodiment of the present invention is schematically shown in FIG. 1. In the system of FIG. 1, there are provided two separate microcomputers. One is an engine computer (E/C) which constitutes an engine control unit 1000. The other is a drive computer (D/C) which constitutes a drive information unit 2500. It is possible to employ a single microcomputer to perform functions of both of the engine computer and the drive computer. However, in this case, a single microcomputer must serve for too many functions and the amount of circuitry must be increased too much, so that, in automotive applications, such a single microcomputer configuration is generally rather disadvantageous in ease of mounting, reliability and economy than the system comprising two microcomputers.

The engine control unit (E/C) 1000 receives various input signals from sensors for detecting engine operating conditions, processes the input signals, and actuates various actuators to control the engine. For example, the engine control unit 1000 receives information on intake air quantity and other information as input signals, determines the instant injectors 10 start to open and the opening time interval of the injectors 10, and delivers command signals to the injectors. Fuel is drawn from a fuel tank 531 by a fuel pump (not shown), and then its pressure is regulated by a fuel pressure regulator 550. Thus, in response to the command signal delivered from the engine control unit 1000, each injector 11 to 16 injects the fuel of regulated pressure into the intake manifold near each cylinder.

On the other hand, the drive information unit (D/C) 2500 receives signals from a fuel residual quantity sensor 532 and indicates the residual quantity of fuel remaining in the fuel tank 531 through a display 2510.

Information is transmitted between the engine control unit 1000 and the drive information unit 2500. For this purpose, the engine control unit 1000 and the drive information unit 2500 are, respectively, initialized, and store necessary data and programs for data transmission.

Figure 2:
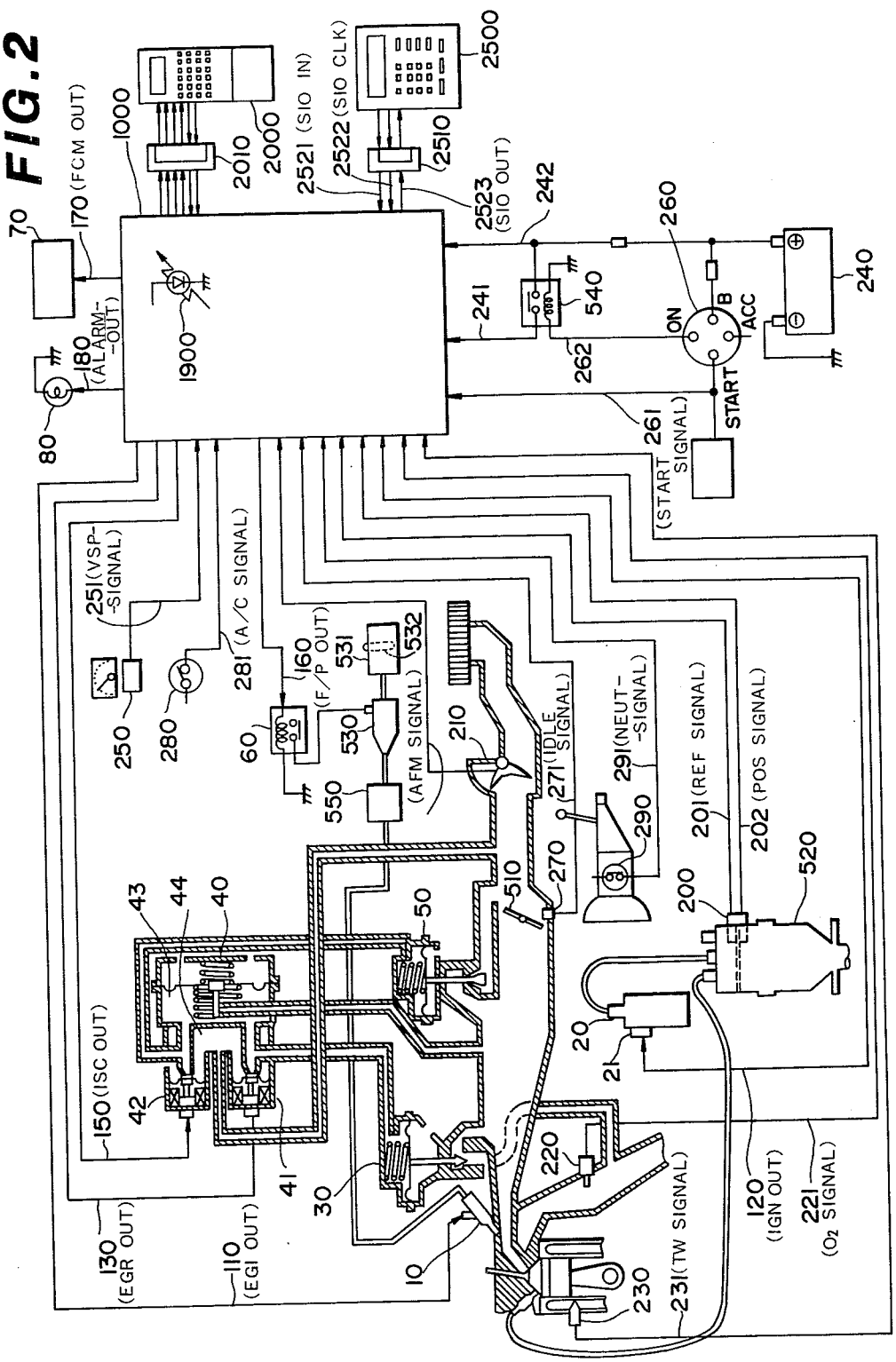
FIG. 2 is a schematic illustration of the engine control system of FIG. 1.

The control system of the engine control unit 1000 applied to a four cycle six cylinder engine is shown in FIG. 2 as an example. In this system, the engine control unit 1000 performs; (1) a fuel injection control through the injector means 10 (EGI control), (2) an ignition control through an ignition coil 20 (IGN control) (3) an exhaust gas recirculation control through an EGR valve 30 controlled by a vacuum control modulator valve 40 (EGR control), and (4) an idle speed control through an auxiliary air control valve 50 controlled by the vacuum control modulator valve 40 for controlling the flow rate of intake air bypassing a throttle valve 510 (ISC control).

In addition to these, the engine control unit 1000 performs; (5) an on/off control of a fuel pump 530 through a fuel pump relay 60 (F/P), (6) a supply of data on fuel consumption quantity to fuel gauge 70 (FCM), (7) a diagnosis of the system and data exchange with a checker 2000 and the drive information unit 2500 (CHECK), (8) output of an alarm signal indicative of a result of the diagnosis to an alarm lump (ALARM), and (9) indication of a result of the diagnosis or other information through a display 1900 (MONIT).

In order to performs these functions, the engine control unit 1000 obtains information, such as (1) a REF signal which rises every 120 degrees in the crankshaft rotation (twice as fast as the rotation of a distributor 520) from a crank angle sensor 200, and a POS signal which alternately rises and falls every one degree in the crankshaft rotation, (2) an AMF signal indicative of intake air quantity from an air flowmeter 270, (3) an 02 signal 221 from an 02 sensor 220, (4) a cooling water temperature signal (Tw signal) 231 from a temperature sensor 230, (5) a voltage signal (Vb signal) from an on-board battery which supplies power to the engine control unit 1000 through a main line 241 via a control unit relay 540 and through a secondary line 242, (6) a vehicle speed signal (VSP) 251 from a vehicle speed sensor 250, (7) a start signal (START) 261 indicative of cranking period from an ignition switch 260, (8) an idle signal (IDLE) 271 from a throttle valve switch 270 for detecting the opening of the throttle valve, (9) an air conditioner signal (A/C) 281 from an air conditioner switch 280, and (10) a neutral signal (NEUT) 291 from a neutral switch 290 detecting the gear position of the automotive transmission.

Furthermore, the engine control unit 1000 is connected via a connector 2010 with the checker 2000 for performing a diagnosis of the control system and indicating its results. The engine control unit 1000 is further connected with the drive information unit 2500 via a connector 2510. Thus, in response to various input signals, the engine control unit 1000 determines optimum values of control command signals, and provides information regarding the controls.

Figure 3:
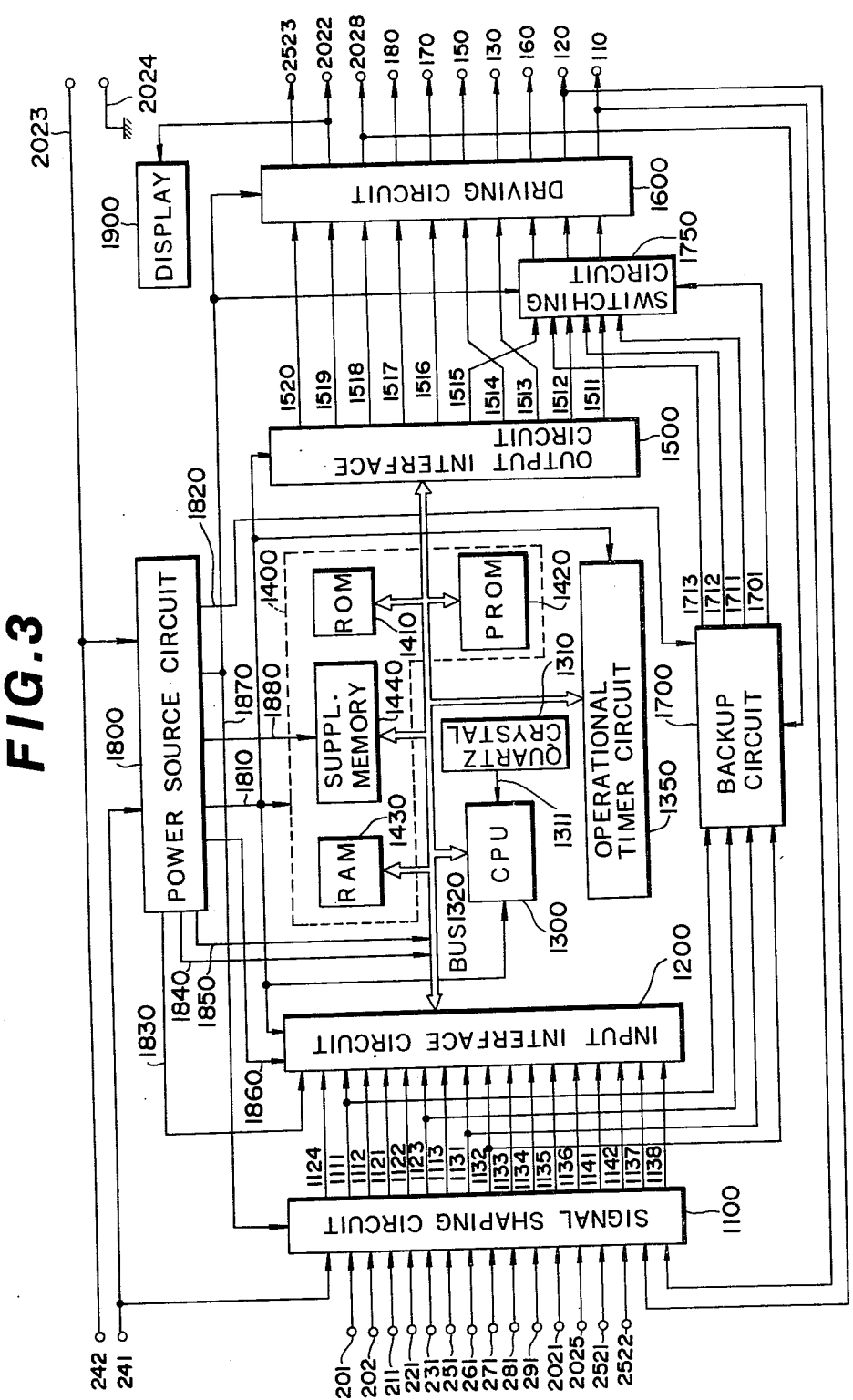
FIG. 3 is a diagram showing the architecture of the engine control unit of FIG. 2.

The architecture of the engine control unit 1000 is shown in FIG. 3.

Various input signals sent from various portions of the engine and the automobile are first fed to a signal shaping circuit 1100 which improves the conditions of the input signals by cutting noise to prevent malfunction of the processor, absorbing surge to prevent damage, and/or amplifying or converting the input signals. The signal shaping circuit 1100 is connected with an input interface circuit 1200, which changes the input signals conditioned by the signal shaping circuit 1100 from analog form to digital form, counts the number of pulses received during a time interval, and stores these data in its registers. A central processing unit (CPU) 1300 is connected with the input interface circuit 1200 and a memory section 1400 through a bus 1320. The CPU 1300 operates in synchronism with timing signals produced in accordance with an output signals 1311 of a quartz crystal unit 1310. Under the control of a program stored in a ROM 1400 and a PROM 1420 of the memory section 1400, the CPU reads in input data stored registers of the input interface circuit 1200, determines output data by processing the input data, and sends the output data to registers of an output interface circuit 1500. Besides the ROM and the PROM, the memory section 1400 has a RAM (read/write memory) 1430 and a supplementary memory 1440 for saving data such as final or intermediate results stored in the volatile RAM during the ignition switch is off.

There is further provided an operational timer circuit 1350 for helping the functions of the CPU 1300. The operational timer circuit 1350 has a multiplier circuit for increasing operating speed, an interval timer for periodically producing interrupt signals and a free running counter for measuring time. The output interface circuit 1500 receives output data of the CPU in its register, conditions these data into proper signal forms, and sends them to a driving circuit 1600 in accordance with a controlled timing. The driving circuit 1600 comprises a power amplifier circuit for driving actuators and displays and sending output signals to the checker 2000.

A backup circuit 1700 monitors the signals of the driving circuit 1600 to detect malfunction of the CPU and the memory section. If a malfunction is detected, the backup circuit 1700, in place of the CPU, receives some of the signals of the signal shaping circuit 1200, and produces control command signals which are unavoidably required to continue driving the vehicle. Upon reception of a switching signal 1701, a switching circuit 1750 blocks the signals from the output interface circuit 1500, and instead, allows the signals from the backup circuit 1700 to pass.

A power source circuit 1800 is supplied with power through the main line 241 and generates a constant voltage (Vcc) 1810 of 5 V for the input interface circuit 1200, the CPU 1300, the memory section 1400 and the output interface circuit 1500, a constant voltage (Vbu) 1820 of 5 V for the backup circuit 1700, a signal (IGN SW) 1830 indicating the on or off state of the ignition switch 260, a reset signal (RESET) 1840, a halt signal (HALT) 1850 for stopping the operations of the CPU 1300, a constant voltage (AVcc) 1860 of 8 V for an A/D converter of the input interface circuit 1200, a constant voltage (Vadd) 1870 for the signal shaping circuit 1100, the switching circuit 1750 and the driving circuit 1600. The power source circuit 1800 receives power through the secondary power supply line 242, and generates from this a constant voltage (Vdm) 1880 for the supplementary memory 1440.

Figure 4:
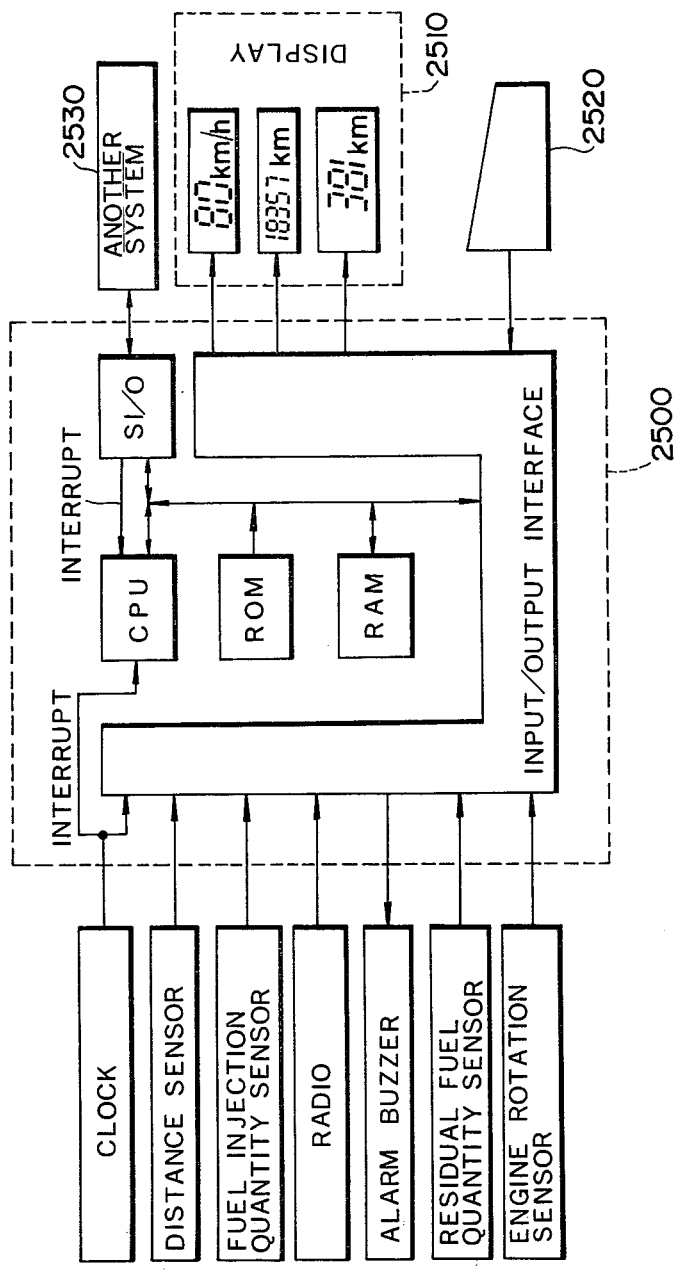
FIG. 4 is an illustration of the system of the drive information unit shown in FIG. 1.

The drive information unit (D/C) 2500 is schematically shown in FIG. 4.

The drive information unit 2500 receives various data about the vehicle from various sensors, processes these data and provides output signals to displays, an alarm buzzer, and automatic control devices. The drive information unit 2500 is further connected with an input device 2520 such as a keyboard, and other computer system 2530 such as the engine control unit.

The functions of the drive information unit 2500 are; (1) reservation of radio program for automatically selecting a preset desired station at a preset time, (2) functions of alarm clock, (3) display of a trip meter for indicating a travel distance from a reset, (4) data preparation for a navimeter for providing navigation information such as actual average vehicle speed, and time and distance errors from a preset schedule, (5) display of fuel consumption quantity from a reset, (6) display for indicating rate of fuel consumption, (7) speed meter, (8) odometer, (9) display of range, that is, the distance that a vehicle can travel before exhausting its fuel supply,

(10) tachometer, (11) functions of memory and electronic calculator.

To perform these functions, the drive information unit 2500 obtains input data from sensors and actuators such as; (1) clock, (2) distance sensor for producing a pulse each predetermined travel distance, (3) fuel injection quantity sensor for producing a pulse each time the accumulated quantity of injected fuel reaches a predetermined amount, (4) radio capable of being automatically controlled by electric signals as to turning on and off, selection of AM and FM, and tuning, (5) alarm buzzer, (6) sensor for measuring the residual quantity of fuel remaining in the fuel tank, (7) engine rotation sensor, (8) display, (9) input device such as a keyboard.

The fuel injection (EGI) control is performed by the engine control unit 1000, as shown in FIGS. 2 and 3. The fuel injectors 10 are disposed adjacent to the intake valve of each cylinder. In the case of a six cylinder engine, there are six injectors 11 to 16, as shown in FIG. 1. Fuel is sucked from the fuel tank 531 by a fuel pump 530 and forced to the injectors 10. On the way to the injectors, the pressure of fuel is regulated by the fuel pressure regulator 550 so that the pressure difference between the fuel pressure and the intake manifold pressure is always constant. Therefore, the quantity of fuel injected by a injector is proportional to the length of time interval during which the injector valve is open. The engine control unit 1000 determines the intake air quantity Qa per time from the AFM signal 211 and the engine rotational speed N rpm from the POS signal 202, and calculates a basic injection time $T_p = K \times (Qa/N)$ (K is constant). As known from the above equation, Tp is proportional to the intake air quantity per one engine revolution.

The thus obtained basic value Tp is multiplied by a correction coefficient (COEF) which is dependent on the engine cooling water temperature signal (Tw signal) 231, the START signal 261, the IDLE signal 271, etc. Because of the varying supply voltage, the rise and fall times of the injectors vary. To compensate for this influence, a voltage correction time Ts determined from the voltage signal (Vb) of the main power supply line is added. During the thus obtained actual injection time, the engine control unit 1000 holds the output line (EGI OUT) in the on state to supply fuel to respective cylinders.

Under predetermined engine operating conditions, the engine control unit performs an air fuel ratio feedback control by using a factor α in accordance with the 02 signal.

Thus, the actual injection time Ti is given by $$Ti = Tp \times COEF \times \alpha + Ts.$$

Fuel supply may be cut off during deceleration or running downhill. To do this, Ti is made equal to Ts. In order to prevent abrupt changes of engine torque due to fuel cutoff or recovery, it is advantageous to cut off or recover fuel supply in a stepwise manner by two or three injectors.

Basically, fuel is injected once in each engine revolution, and accordingly, fuel injection timing is synchronous with a signal having the period three times as long as the period of the REF signals. However, fuel injection start time may be shifted by the aid of the POS signals in accordance with engine operating conditions. During acceleration where intake air amount changes abruptly, fuel may be injected asynchronously with engine rotation.

As explained above, the pressure difference between the fuel pressure and the intake manifold vacuum is maintained constant by the fuel pressure regulator 550, and the opening size of the injector valves 10 is also constant. Therefore, it is possible to calculate the total fuel injection quantity during a predetermined time interval by accumulating the injector opening time, that is, the injector pulse width, of each injection.

On the other hand, the residual fuel quantity sensor 532 disposed in the fuel tank 531 measures the residual quantity of fuel remaining in the fuel tank. Therefore, it is possible to know the consumption quantity of fuel consumed during a predetermined time interval by calculating the difference of the residual fuel quantity between the start and end of the time interval.

Thus, it is possible to detect a fault of the fuel system of the engine by checking the difference between the fuel injection quantity and the fuel consumption quantity during the same time interval which are obtained independently. If the difference is within a certain permissible range which is determined taking measurement errors into consideration, it can be considered that there is no fault in the fuel system including means for measuring the fuel injection quantity and the fuel consumption quantity. If, on the other hand, the difference is beyond the permissible range, it is considered that there is a fault somewhere in the fuel system.

The residual fuel quantity sensor may be a fuel level gauge commonly used in automobiles. Generally, the residual fuel quantity is calculated from a fuel level in the fuel tank using the preliminarily measured values about the shape, the sectional area, the depth of the fuel tank, and converted into electrostatic capacity. The drive computer 2500 processes data and sends an output signal to the display 2510.

Figure 5:
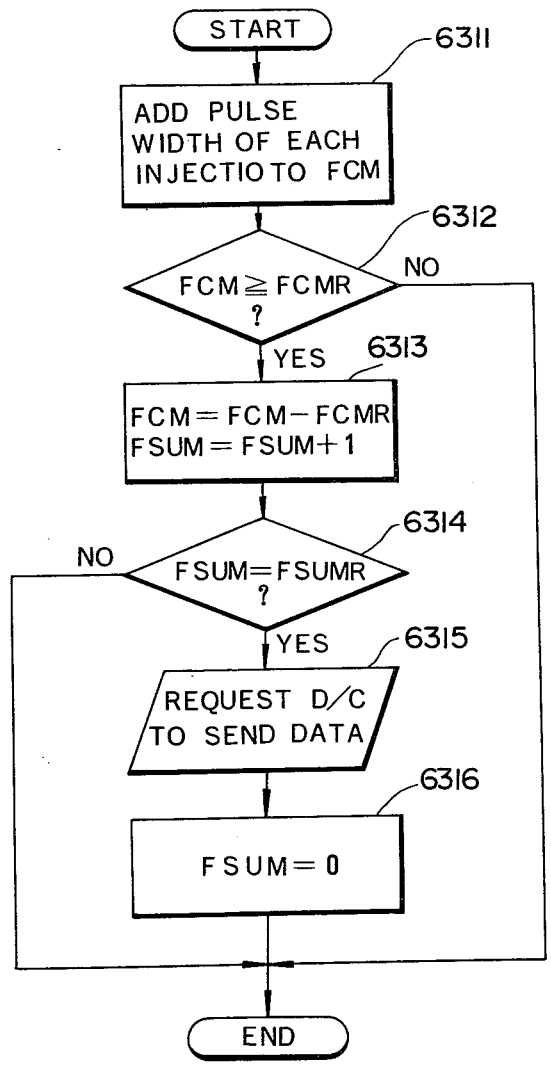
FIG. 5 is a flowchart of a program of the engine control unit for calculating the fuel injection quantity.

The program for calculating the fuel injection quantity by the engine control unit 1000 is shown in FIG. 5. This program can be incorporated into a program for calculating, in synchronism with engine rotation, variations of correction coefficients in the fuel injection control system, and is executed each time fuel is injected in synchronism with engine rotation.

At a step 6311, an effective injector pulse width (Te) is added to an accumulated data FCM each time fuel is injected. At a step 6321, the CPU checks if FCM reaches a predetermined value FCMR. If FCM does not reach FCMR, the CPU jumps to the end of the program. If FCM reaches FCMR, the CPU substracts FCMR from FCM, replaces the old value of FCM with the remainder of the subtraction, as a new value of FCM, and then adds one to count data FSUM for indicating the number of times FCM reaches FCMR. This operation is a kind of carry operation which is desired in view of the capacity of the computer. At a step 6314, the CPU checks if FSUM reaches a predetermined value FSUMR. If FSUM is not equal to FSUMR, the CPU jumps to the end of the program. If FSUM reaches FSUMR, the CPU requests the drive information unit 2500 to send data on the residual fuel quantity at a step 6315, and clears FSUM to zero at a step 6316. Thus, the engine control unit 1000 requests the drive information unit 2500 to send data on the residual fuel quantity each time the fuel injection quantity reaches a certain amount $$FS = FCMR \times FSUMR.$$

Figure 6:
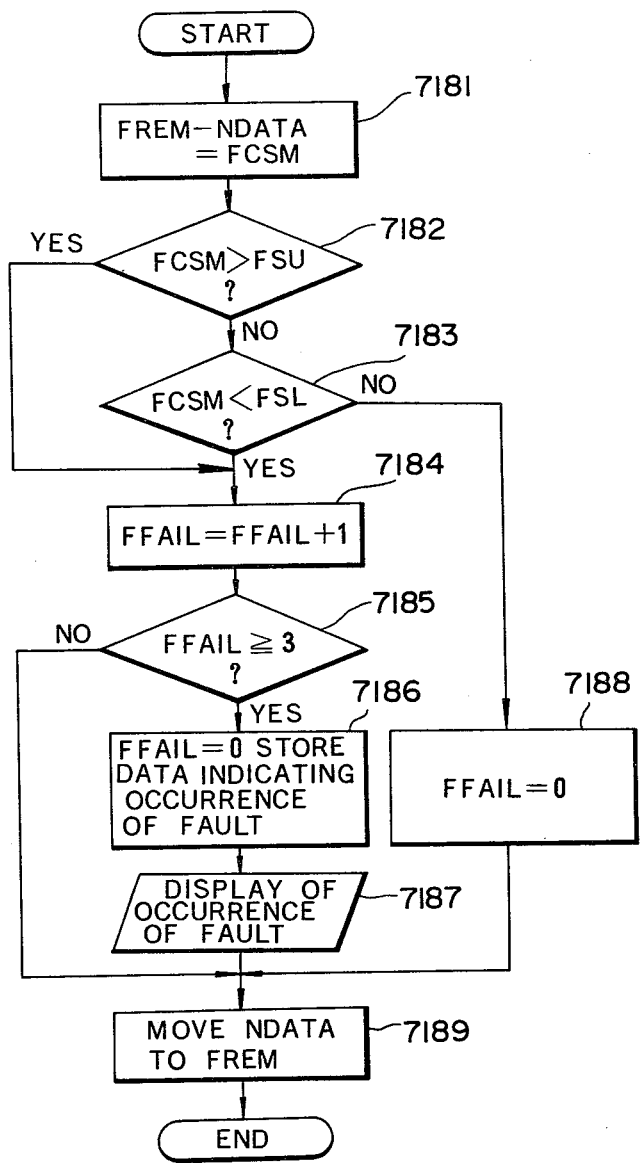
FIG. 6 is a flowchart of the engine control unit for a diagnostic check.

The program the engine control unit executes when data on the residual fuel quantity is sent from the drive information 2500 is shown in FIG. 6. The drive information unit 2500 determines the present fuel residual quantity from the signal of the residual fuel quantity sensor 532. Upon each receipt of a request signal from the engine control unit 1000 for requesting data on the residual fuel quantity, the drive information unit 2500 transfers data representing the present residual fuel quantity, as data NDATA, to the engine control unit 1000. In the RAM of the engine control unit 1000, data of the old residual fuel quantity which is sent to the engine control unit 1000 in the previous operation is stored as data FREM. The CPU of the engine control unit 1000 first calculates the difference FCSM between the present data entry NDATA and the old value FREM, at a step 7181. The FCSM data indicates the consumption quantity of fuel in the fuel tank during the interval during which fuel is injected by the quantity $FS = FCMR \times FSUMR$. At steps 7182 and 7183, the CPU checks the difference FCSM. If fuel is being injected correctly and there is no fault in the fuel system, the fuel consumption quantity FCSM must be equal to the fuel injection quantity FS of the same interval. However, measurement errors must be taken into consideration. Therefore, the fuel consumption quantity FCSM is first compared with an upper limit values FSU which is the sum of the predetermined fuel injection quantity FS and the value of permissible error, at the step 7182, and then compared with a similar lower limit value FSL at the step 7183. If the fuel consumption quantity FCSM is between the upper limit value FSU and the lower limit value FSL, the CPU judges the fuel system is in order, and clears count data FFALL for indicating the number of occurrences of abnormality, at a step 7188.

If FCSM is not between FSU and FSL, the CPU judges there is abnormality somewhere in the fuel system, and add one to the count data FFALL, at a step 7184. At a step 7185, the CPU checks if the data FFALL reaches three. If FFALL is smaller than three, it is decided there is no fault. If FFALL is equal to or greater than three, it is decided that some fault occurs, and the CPU clears FFALL to zero in preparation for the next diagnosis and stores data indicating occurrence of fault in a predetermined location of the supplementary memory 1440. This data is utilized by the checker 2000.

At a step 7187, the CPU produces an output signal to indicate occurrence of fault. Such an indication may be performed through the drive information unit 2500 or by a special warning display.

Finally, at at step 7189, the CPU moves NDATA which is transferred in the present operation to FREM which is used, as the old data, in the next operation.

It is advisable not to decide there is a fault when the fuel consumption quantity goes beyond the range between the upper limit value FSU and the lower limit value FSL only once or twice. The reasons for this are (1) that, if a noise disturbs the value of NDATA, abnormality is detected this time and the next time, and (2) that, if fuel is supplied to the fuel tank during a diagnosis cycle, it is meaningless to compare the present residual fuel quantity with the previous residual fuel quantity. Thus, the reliability of the fault diagnosis is improved by judging an occurrence of fault only when abnormality is detected more than three times.

In the above mentioned embodiment, a diagnostic check is made periodically each time the fuel injection quantity amounts to a predetermined quantity. However, it is optional to compare the fuel consumption quantity and the fuel injection quantity at regular intervals, that is, the length of each interval is fixed. In this case, time is measured to determine correct times to check.

Furthermore, the diagnostic checks may be made each time the fuel consumption quantity measured by the residual fuel quantity sensor reaches a predetermined amount. In this case, the drive information unit 2500 sends data each time the fuel consumption quantity amounts to a predetermined quantity, without request from the engine control unit, and then the engine control unit performs the comparison check with the fuel injection quantity.

It is also optional to perform the comparison check between the fuel injection quantity and the fuel consumption quantity by using the drive information unit 2500 instead of the engine control unit 1000.

Furthermore, to provide two microcomputers is not essential to the present invention. That is, it is possible to perform the diagnostic check only by the engine computer, without the drive computer. In this case, the output signal of the residual fuel quantity sensor is directly supplied to the engine computer.

It is to be noted that the measurement accuracy of the fuel quantities is dependent upon the length of interval of the checks. That is, the measurement accuracy is degraded as the interval of the checks is shortened. Accordingly, it is better to make the interval of the checks relatively long, but not longer than the interval of fuel supply. In view of these, the interval during which fuel of about 1 to 10 liters is consumed is preferable.

Thus, according to the present invention, there is no need of checking each injector separately, and accordingly, there is no need of providing many input/output circuit of the control unit. Furthermore, the fault diagnostic system of the present invention can detect not only troubles such as disconnection of the wiring of the injectors and electrical faults in the electronic fuel injection control system, but also it can detect, as an overall fault of the fuel system, mechanical troubles such as malfunctions due to clogging of an injector or abnormality in fuel pressure and trouble of the residual fuel quantity sensor. Thus, the fault diagnosis according to the present invention is accurate and reliable.

What is claimed is:

1. A fault diagnostic system for detecting faults in a fuel system of an engine with an electronic fuel injection system, comprising:
    means for determining the injection quantity of fuel injected by injector means by summing the length of the injector opening time of each injection,
    means for measuring the residual quantity of fuel remaining in a fuel tank for the engine,
    means for calculating the consumption quantity of fuel removed from the fuel tank by calculating the amount of a decrease of the residual fuel quantity measured by said residual quantity measuring means,
    checking means which receives information on the fuel injection quantity from said fuel injection quantity determining means and information on the fuel consumption quantity from said fuel consumption quantity calculating means, calculates the difference between the fuel injection quantity of a predetermined time interval and the fuel consumption quantity of the same time interval, checks if the difference is within a predetermined permissible range, and produces an abnormal signal when the difference is outside the range, indicating means for producing a fault signal indicative of the existence of a fault in response to said abnormal signal.

2. A fault diagnostic system according to claim 1, wherein said checking means periodically performs a check as to the difference between the fuel injection quantity and the fuel consumption quantity of the interval of two successive checks.

3. A fault diagnostic system according to claim 2, wherein said checking means performs the check each time the fuel injection quantity increases by a predetermined amount.

4. A fault diagnostic system according to claim 2, wherein said checking means performs the check each time the fuel consumption quantity increases by a predetermined amount.

5. A fault diagnostic system according to claim 2, wherein said checking means performs a check at regular intervals of a fixed length.

6. A fault diagnostic system according to claim 2, wherein said indicating means produces said fault signal only when the number of occurrences of said abnormal signals reaches a predetermined number.

* * * * *